United States Patent [19]
Bertocci et al.

[11] Patent Number: 6,148,213
[45] Date of Patent: *Nov. 14, 2000

[54] METHOD AND APPARATUS FOR ACCESSING A TELEPHONE ANSWERING DEVICE FROM A CORDLESS TELEPHONE PORTABLE UNIT

[75] Inventors: Guido Bertocci, Freehold; Howard M. Singer, Marlboro, both of N.J.

[73] Assignee: Lucent Technologies Inc., Murray Hill, N.J.

[*] Notice: This patent issued on a continued prosecution application filed under 37 CFR 1.53(d), and is subject to the twenty year patent term provisions of 35 U.S.C. 154(a)(2).

[21] Appl. No.: 08/498,306

[22] Filed: Jul. 5, 1995

[51] Int. Cl.⁷ ...................................................... H04Q 7/20
[52] U.S. Cl. .......................... 455/462; 455/412; 455/567
[58] Field of Search .................. 379/58, 61, 63, 379/67, 88, 70, 77, 79, 142; 455/462, 414, 415, 403, 422, 567, 550, 566, 412

[56] References Cited

U.S. PATENT DOCUMENTS

| | | | |
|---|---|---|---|
| 4,677,655 | 6/1987 | Hashimoto | 379/61 |
| 4,881,259 | 2/1992 | Scordato | 379/58 |
| 4,894,861 | 1/1990 | Fujioka | 379/142 X |
| 5,063,588 | 11/1991 | Patsiokas et al. | 379/58 X |
| 5,224,151 | 6/1993 | Bowen et al. | 379/58 |
| 5,253,287 | 10/1993 | Hasegawa | 379/61 |
| 5,481,596 | 1/1996 | Comerford | 379/88.23 |
| 5,526,406 | 6/1996 | Luneau | 455/563 |
| 5,581,599 | 12/1996 | Tsuji et al. | 379/63 |
| 5,953,656 | 9/1999 | Bertocci | 455/412 |

FOREIGN PATENT DOCUMENTS 59-74739  4/1984  Japan .

OTHER PUBLICATIONS

Owner's Manual, AT&T Cordless Answering System 5600, © 1990 AT&T, pp. 24–45.

*Primary Examiner*—William G. Trost
*Attorney, Agent, or Firm*—Samuel R. Williamson; Thomas J. Bean

[57] ABSTRACT

A cordless telephone provides for increased features available at a portable unit that have heretofore been available only at a base unit which combines a cordless telephone fixed station and telephone answering device. The cordless telephone includes a call screening feature which allows a user at the portable unit to monitor incoming messages received over telephone lines as they are being recorded at the telephone answering device without the user having to configure the portable unit in any way during actual receipt of the message. A built-in loudspeaker is incorporated into the portable unit so that the user may easily listen to the incoming messages. Once receipt of the incoming message is completed, amplifier circuitry driving the loudspeaker is turned off. The cordless telephone also includes a caller-ID feature which informs the user at the portable unit of the identity of a preidentified calling party before the call is answered. This operation is achieved by the user entering into a memory table in the telephone each one of a plurality of desired telephone numbers for subsequent access and comparison when a caller-ID number is received from a calling party. The user also associates with each telephone number a voice message which is subsequently generated in the loudspeaker in the portable unit in response to a favorable comparison between the caller-ID signal and the stored telephone number.

6 Claims, 5 Drawing Sheets

METHOD AND APPARATUS FOR ACCESSING A TELEPHONE ANSWERING DEVICE FROM A CORDLESS TELEPHONE PORTABLE UNIT

BACKGROUND OF THE INVENTION

1. Technical Field

This invention relates to cordless telephones and, more particularly, to a cordless telephone which incorporates a telephone answering device interrogatable from a portable unit associated with said telephone.

2. Description of the Prior Art

Cordless telephone systems and telephone answering devices are both in wide use today in many businesses and homes. Both cordless telephone systems and telephone answering devices have specific or unique features and in different ways are very beneficial to a user. For example, a cordless telephone system, which includes a portable or handset unit and a base unit, permits a user to become untethered and move about freely in a business or at home. The greater mobility provided to a user of a cordless telephone system over, for example, a corded telephone system is readily apparent. And a telephone answering device is quite useful for a user in that it answers incoming calls and records messages when the user cannot or does not want to answer the telephone. The answering device may also note the day and time for each message and advantageously allows the user to retrieve his or her messages either when colocated with the answering device or located remote from such device.

Many arrangements are available today that integrate both cordless telephone systems and telephone answering devices. Two specific arrangements are respectively described in U.S. Pat. Nos. 4,677,655 and 4,881,259. A cordless answering System is also commercially available from AT&T Corp. as Model Number 5600. Although flexibility and control are available in these integrated systems, such systems do not provide at the handset unit some features that are available at a combined cordless telephone base unit and telephone answering device. Moreover, such systems do not permit accessing information now generally available from a caller for assisting a user in deciding whether to answer or not answer an incoming call. While these above arrangements have been generally satisfactory in the past, it is now technically feasible and desirable to provide an integrated cordless telephone and telephone answering device which permits a user to access both features and additional information present at the combined base unit and telephone answering device while remaining relatively easy to operate.

SUMMARY OF THE INVENTION

In accordance with the present invention, a cordless telephone provides increased features accessible at a portable unit that have heretofore been available only at a base unit which combines a cordless telephone fixed station and a telephone answering device.

In a first aspect of the invention, the cordless telephone includes a call screening feature which allows a user at the portable unit to monitor incoming messages received over telephone lines as they are being recorded at the telephone answering device without the user having to configure the portable unit in any way during actual receipt of the message. A built-in loudspeaker is incorporated into the portable unit so that the user may easily listen to the incoming messages. Once receipt of the incoming message is completed, amplifier circuitry driving the loudspeaker is turned off.

In a second aspect of the invention, the cordless telephone includes a caller-ID feature which informs the user of the portable unit of the identity of a pre-identified calling party before the call is answered. This operation is achieved by the user entering into a memory table in the telephone each one of a plurality of desired telephone numbers for subsequent comparison with a caller-ID number received from a calling party. The user also associates with each stored telephone number a voice message which is generated in the loudspeaker in the portable unit in response to a favorable comparison between said caller-ID signal and said stored telephone number.

BRIEF DESCRIPTION OF THE DRAWINGS

This invention and its mode of operation will be more clearly understood from the following detailed description when read with the appended drawing in which.

Throughout the drawings, the same element when shown in more than one figure is designated by the same reference numeral.

DETAILED DESCRIPTION

Figure 1:
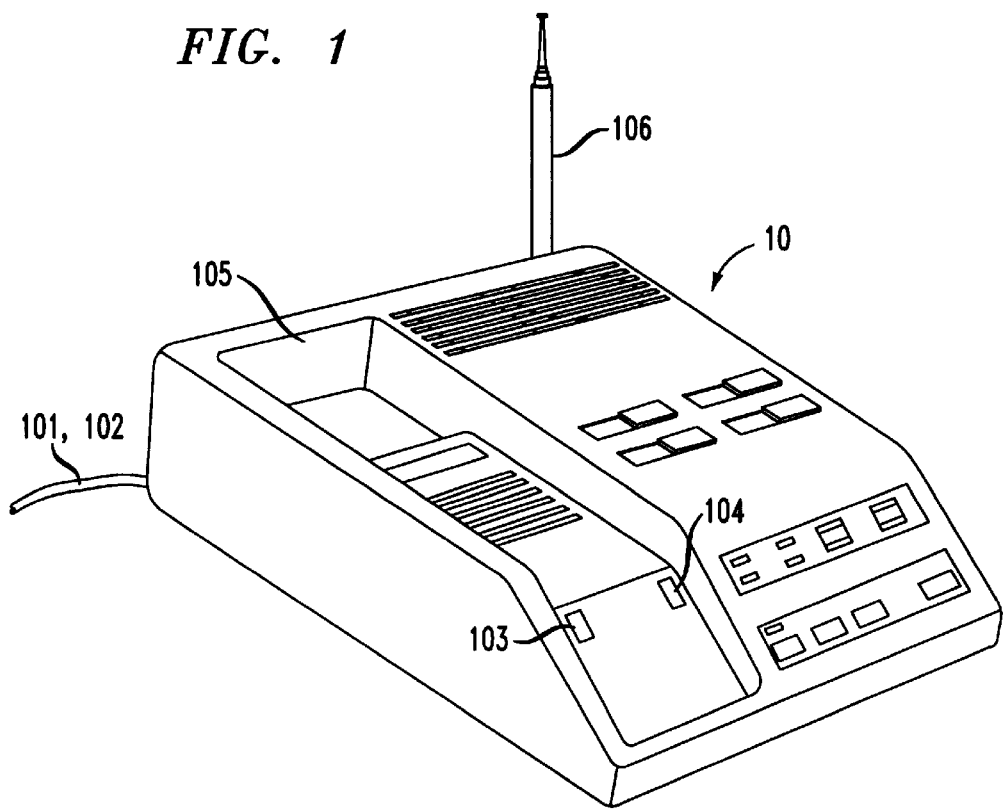
FIG. 1 shows a perspective view of a cordless telephone base unit and telephone answering device in combination, to which the present invention may be applied.
Figure 2:
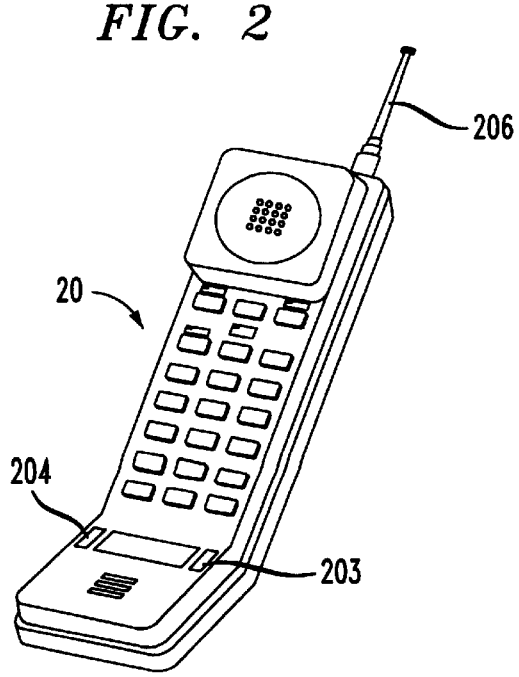
FIG. 2 shows a front perspective view of a cordless telephone portable unit to which the present invention may be applied.
Figure 3:
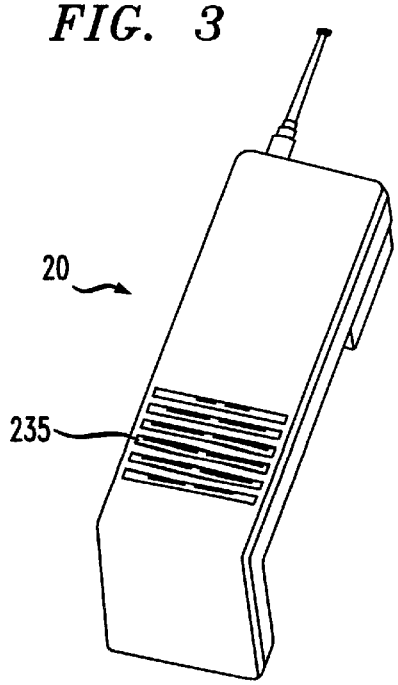
FIG. 3 shows a rear perspective view of a cordless telephone portable unit to which the present invention may be applied.

Referring now to FIGS. 1, 2 and 3 in combination, there is shown a communication system which includes a base unit 10, shown in FIG. 1, along with a portable transceiver or handset unit 20, shown in both FIGS. 2 and 3, with which the base unit 10 communicates. The base unit 10 includes both a telephone answering device (TAD) for automatically responding to incoming telephone calls and a fixed transceiver for communicating voice and TAD signals between the base unit 10 and the handset unit 20.

In the operation of this communication system, the base unit 10 transmits to and receives signals from the handset unit 20 over an antenna 106. The base unit also receives signals from and couples signals onto a telephone line 101, 102. The base unit, as more fully described later herein, through TAD circuitry incorporated therein, also answers calls, records messages when a user cannot or does not want to answer the telephone, and notes the time and day of each message. The TAD circuitry also is capable of recording memos and telephone conversations and permits a user to retrieve messages when the user is away from home. The handset unit transmits and receives signals over an antenna 206 and is used to contact base unit 10 for enabling the placing of a call over the telephone line 101, 102 as well as for accessing features and functions provided by the TAD circuitry located in the base unit.

In order to prevent an unauthorized user in possession of a handset unit from obtaining access to base unit 10, a randomly generated security code stored in base unit 10 is transferred to handset unit 20 while the handset unit is located in a mating cradle 105 in the base unit 10. A battery, which allows operation of the handset unit 20 while remote from the base unit 10, is normally charged when the handset unit 20 is placed in the base unit charging cradle 105. This battery is described later herein with reference to FIG. 4. A direct-current charging path for the battery is established over contacts 103 and 104 in the base unit 10 and contacts 203 and 204 in the handset unit 20 for charging of the battery. These contacts also allow transfer circuits in the base unit 10 and the handset unit 20 to respectively transmit and receive the security code and also an operating frequency channel over this path. A format suitable for transferring of the security code and other data over a direct-current charging path is described in U.S. Pat. No. 4,736,404 issued to R. E. Anglikowski et al. on Apr. 5, 1988.

In the handset unit 20, a controlled power-up/power-down mode of operation is implemented. Power to a radio receiver, a control unit and certain other selected circuitry in the handset unit 20 are controlled to minimize power consumption when the handset unit 20 is in a standby-and-out-of-cradle state. The handset unit 20 resides in this state while not being used by a user in communicating with the base unit 10. Power to other non-essential circuitry in the handset unit is turned completely off during this power saving state.

During the power-up/power-down (battery saver) mode of operation, multiple events can cause the control unit to turn on to a full operating mode from the alternating power-up/power-down mode. A key depression on the handset unit, detection of a digitally formatted radio signal transmitted from the base unit 10, and the handset unit 20 being cradled in the base unit 10 for charging are all events which cause the control unit in the handset unit 20 to turn on to and remain in the full operating mode until processing of these events is completed.

A message format for the radio signals transmitted between the base unit and the handset unit is provided in the form of frequency shift keyed (FSK) signals and includes a data field. This data field may be in the form of either command opcode data or dial digit data, thereby allowing for many different commands or functions. The message format also includes a synchronizing header signal that immediately precedes the data field. A format suitable for transmission of the data messages between the base unit 10 and the handset unit 20 is described in U.S. Pat. No. 4,731,814 which issued to W. R. Becker et al. on Mar. 15, 1988.

Any communications between the base unit and the handset unit are established first through interpretation of the data field in the FSK signals. By way of example, when the base unit receives the incoming ringing signal on the telephone lines, it transmits the FSK signal with the ring-on opcode to the handset unit for changing the handset unit 20 from the alternating power-up/power-down mode to the full operating mode. But before the handset unit will respond to the base unit, the security code that the handset unit recognizes also must be in the data field received by the handset unit.

When a signal is transmitted on the frequency on which the handset unit 20 is monitoring, the handset unit receiver turns on and remains on long enough to receive and interpret the security code transmitted by a base unit on this frequency. The security code identifies the transmitting base unit as being the correct base unit to which the handset unit should respond. All other signals received on this frequency without a security code that the handset unit recognizes are ignored. Once the handset unit has verified that the signaling base unit has the proper security code, it turns on to a full operating mode, in this instance the PHONE mode. If the handset unit does not recognize the code being transmitted by the base unit, it leaves the full operating mode and returns to the power-up/power-down mode of operation. This common security code is also included in any transmission of the FSK signals from the handset unit to the base unit and must similarly identify the handset unit as being the correct handset unit to which the base unit should respond. The handset unit receiver also remains on for approximately 10 seconds whenever a user goes on-hook at the handset unit, i.e., terminates the interaction with or through the base unit while in the PHONE mode, INTERCOM mode or TAD interrogation mode.

The communication system includes a call screening feature operable from the handset unit 20. In essence, this feature, in a first configuration, allows a user holding the handset unit 20 to monitor at this unit incoming messages received over telephone lines as they are being recorded, without interrupting the recording action of the TAD in the base unit 10 and without directly connecting the user to the calling party. This functionality is invoked via a first selection button (not shown) on the handset unit which transmits a first unique digital command information code from the handset unit to the base unit 10. This command information code causes the base unit 10 to transmit on the frequency which the handset unit 20 is then monitoring the prerecorded message that is outgoing over the telephone lines and any message that is incoming over the telephone lines.

A user at the handset unit may end the monitoring of an incoming message either by answering the call or without answering the call. To answer the call and speak to the calling party, the user depresses a second selection button on the handset unit which transmits a second unique digital command information code from the handset unit to the processor in the cordless telephone base unit. When this information code is received in the base unit 10, the TAD stops playing the prerecorded outgoing message or recording any incoming message, and both the RF transmitter and the RF receiver in the base unit remain activated for enabling the user at the handset unit to communicate with the calling party.

For ending the monitoring of incoming messages without answering the call, the user at the handset unit depresses a third selection button on the handset unit which transmits a third unique digital command information code from the handset unit to deactivate the RF transmitter in the base unit.

Figure 4:
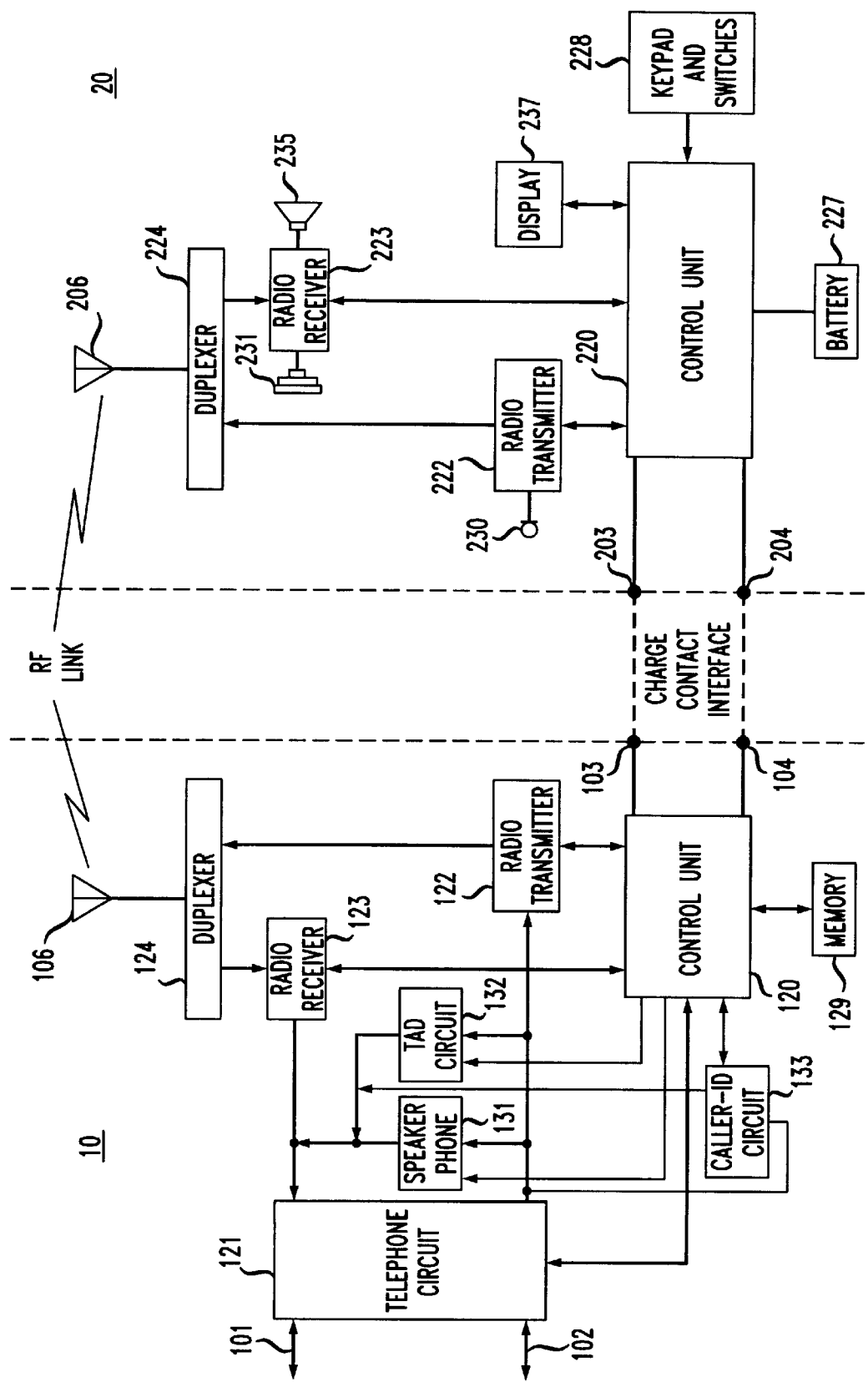
FIG. 4 is a functional block representation of the cordless telephone base unit and telephone answering device of FIG. 1 in combination, and also the cordless telephone portable unit of FIGS. 2, 3, 7 and 8, operative in accordance with the principles of the present invention.

In accordance with a disclosed embodiment of the invention, an additional level of convenience in operating the call screening feature from the handset unit 20 is provided for the user of this unit. This feature, in a second configuration, i.e., auto monitor feature, allows the user at the handset unit to monitor incoming messages received over telephone lines as they are being recorded without the user having to configure the handset unit in any way during actual receipt of the message. A built-in loudspeaker 235, shown in FIG. 4, is incorporated into the handset unit 20 for audibly reproducing the incoming message at the handset unit. When the base unit 10 answers an incoming call, the loudspeaker 235 is optionally preconfigurable to automatically turn on and allow the handset user to conveniently monitor the incoming message without manually manipulating the handset unit in any way during the operation of the TAD circuitry. Once receipt of the incoming message is completed, as reflected by the TAD circuitry, amplifier circuitry driving the loudspeaker is turned off. This operation is explained in greater detail later herein.

While the call screening feature at the handset unit is operating in the second configuration, a user at the handset unit may end the monitoring of an incoming message by answering the call. To answer the call and speak to the calling party, the user depresses the second selection button on the handset unit which transmits the second unique digital command information code from the handset unit to the processor in the cordless telephone base unit. When this information code is received in the base unit 10, the TAD circuitry stops playing the prerecorded outgoing message or recording any incoming message, and both the RF transmitter and the RF receiver in the base unit remain activated for enabling the user at the handset unit to communicate with the calling party.

Figure 7:
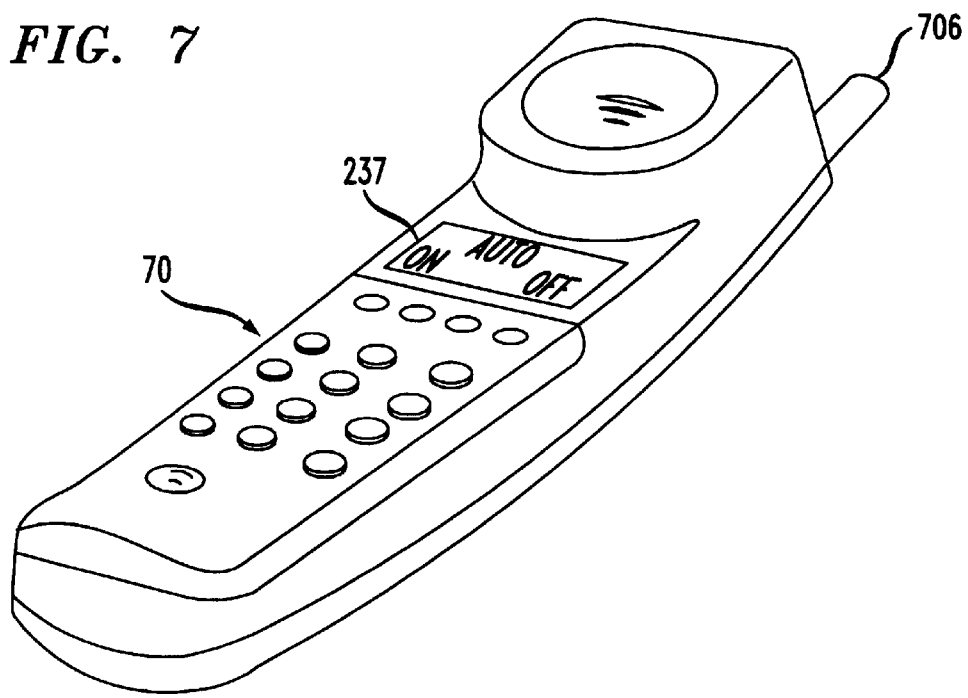
FIG. 7 shows a front perspective view of an alternative portable unit to which the present invention may be applied.
Figure 8:
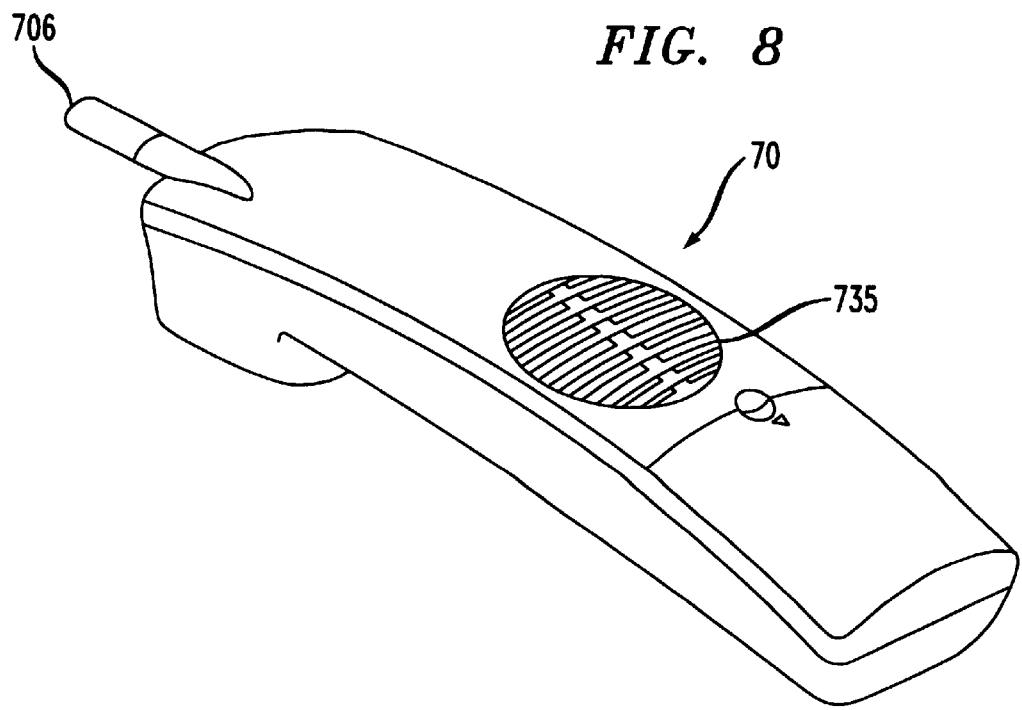
FIG. 8 shows a rear perspective view of an alternative portable unit to which the present invention may be applied.

Referring next to FIG. 4, there is shown a block representation of the major functional components of the base unit 10 and also of the handset unit 20, the base unit being depicted in FIG. 1, a first handset unit being depicted in both FIGS. 2 and 3, and an alternative handset unit being depicted in both FIGS. 7 and 8, these units all being operative over a plurality of communication channels.

Included in the base unit 10 is a control unit 120 which advantageously provides a number of control functions. The control unit 120 generates security code and frequency channel data, which includes data indicative of an active channel selected by the base unit 10 and initially communicated to the handset unit 20 over the charge contact interface 103, 104, 203, and 204 or subsequently over the radio frequency (RF) link as needed to avoid interference. An arrangement suitable for use in selecting an active channel free of interference is described in U.S. Pat. No. 5,044,010 which issued to R. Frenkiel on Aug. 27, 1991, this patent being incorporated herein by reference.

Speakerphone 131 and TAD circuit 132 are advantageously included in the base unit 10 for providing additional functions and features for this unit. Circuitry suitable for use in speakerphone 131 is commercially available from AT&T as either speakerphone Model S201 or speakerphone Model 870. This speakerphone circuitry is also suitably described in U.S. Pat. Nos. 4,887,288, 4,901,346 and 4,959,887.

TAD circuitry has previously been incorporated into cordless telephones. Two such examples are respectively described in U.S. Pat. Nos. 4,677,655 and 4,881,259. Also a cordless answering system Model 5600, commercially available from AT&T incorporates circuitry suitable for use in base unit 10 including, with some modifications which are fully disclosed herein, TAD circuit 132. Additional circuitry suitable for use in TAD circuit 132 is commercially available from AT&T in digital answering systems, Models 1343, 1545, 1710, 1756 and 1830, for example. A conventional power supply (not shown) provides operating power for all of the circuitry in the base unit 10.

As earlier indicated, the communication system includes a call screening feature operable in the first configuration by the user while holding the handset unit 20 or, in accordance with the disclosed embodiment, operable in the second configuration automatically without assistance from the user.

In the execution of the call screening feature, while in the first configuration, the control unit 120 interprets the first unique digital command information code received from the handset unit 20 and causes the radio transmitter 122 in the base unit to become activated for transmitting directly to the handset unit a prerecorded message that is outgoing over the telephone lines and any message that is incoming over the telephone lines. Thus, the user of the handset may monitor an incoming message at the handset unit by depressing the first selection button (not shown) on the handset unit which transmits the first unique digital command information code from the handset unit to the base unit 10.

A user at the handset unit may end the monitoring of an incoming message either by answering the call or without answering the call. Upon the user depressing the second selection button, which answers the call, the second unique digital command information code is transmitted from the handset unit and received by the control unit 120 in the base unit 10. Once the information code is received, the control unit causes the TAD circuit 132 to stop playing the prerecorded outgoing message or recording any incoming message, and also keeps activated both the RF transmitter and the RF receiver in the base unit for enabling the user at the handset unit to communicate with the calling party.

When the user at the handset unit desires to end the monitoring of incoming messages without answering the call, the user depresses the third selection button on the handset unit which transmits the third unique digital command information code from the handset unit to the base unit. This information code causes the control unit 120 to deactivate the RF transmitter in the base unit.

As earlier indicated herein, an additional level of convenience in operating the call screening feature from the handset unit 20 is provided for the user of this unit. This call screening feature, while in the second configuration, allows the user at the handset unit to monitor incoming messages received over telephone lines as they are being recorded without the user having to configure the handset unit in any way during the receipt of the message. The built-in loudspeaker 235 in the handset unit 20 audibly reproduces the incoming message at the handset unit when the TAD circuitry 132 in the base unit 10 answers an incoming call. A fourth unique digital information code is transmitted from the base unit to the handset unit when the TAD circuit 132 goes off-hook to answer the incoming call.

Upon receipt of this fourth unique digital information code by the control unit 220, this control unit determines whether a call monitoring flag is set or not set in memory in the handset unit. If the call monitoring flag is set, amplifier circuitry in radio receiver 223 for operating the loudspeaker 235 is automatically turned on by the control unit 220 and allows the handset user to conveniently monitor the incoming message without manually manipulating the handset unit in any way during the operation of the TAD circuit 132. Once receipt of the incoming message is completed, as reflected by transmission of a fifth unique digital information code from the base unit when the TAD circuit 132 goes on-hook, the amplifier circuitry driving the loudspeaker is turned off.

A user at the handset unit may end the monitoring of an incoming message, while the call screening feature is in the second configuration, by answering the call. Upon the user depressing the second selection button, which answers the call, the second unique digital command information code is transmitted from the handset unit and received by the control unit 120 in the base unit 10. Once the information code is received, the control unit causes the TAD circuit 132 to stop playing the prerecorded outgoing message or recording any incoming message, and keeps activated both the RF transmitter 122 and the RF receiver 123 in the base unit for enabling the user at the handset unit to communicate with the calling party.

The user of the handset unit also may desire to end monitoring of the incoming message without answering the call, while the call screening feature at the handset unit is operating in the second configuration. In performing this operation, the user depresses the third selection button on the handset unit which transmits the third unique digital command information code from the handset unit to the base unit. This information code causes the control unit 120 to deactivate the RF transmitter 122 in the base unit 10.

The security code data, transmitted from the base unit 10 to the handset unit 20 via the battery charge contact interface, is transmitted while establishing initial communications or call set-up during the time that the handset unit 20 is located remote from the base unit 10 as well as during the transfer of subsequent opcode data between these units during ongoing communications. This control unit 120 compares the received security code data with its stored security code data during the establishing of the two-way RF communications link between the handset unit 20 and the base unit 10. A favorable comparison of the data from the two security codes must be achieved in order for the base unit 10 to respond to a request-for-service signal from a handset unit. This control unit 120 also receives and processes opcode data provided by the handset unit 20 for dialing and providing signaling information out to a central office or other appropriate switch via a telephone circuit 121 and over tip-ring lines 101 and 102. Control unit 120 may be implemented through the use of a microcomputer containing ROM, RAM and through use of the proper coding. Such a microcomputer is known in the art and is readily available from semiconductor manufacturers such as Signetics, Intel and AMD. The telephone circuit 121 serves as a "plain old telephone service" (POTS) interface for voice signals on the tip-ring lines 101 and 102 which are sent to radio transmitter 122, speakerphone 131, and TAD circuit 132. And voice signals from the radio receiver 123, speakerphone 131, and TAD circuit 132 are received by the telephone circuit 121.

Both the base unit 10 and the handset unit 20 are operable on a plurality of communication channels. The control unit 120 configures the radio transmitter 122 and the radio receiver 123 in the base unit 10 for proper operation on the active one of the plurality of channels when communicating with handset unit 20.

The transmit and receive signals of the base unit 10 are coupled to a duplexer 124 which permits the radio transmitter 122 and the radio receiver 123 to both simultaneously operate over antenna 106 while preventing the output of transmitter 122 from being coupled directly to the input of the receiver 123. When the base unit is in an idle state awaiting an incoming telephone call or a request-for-service signal from the handset unit, transmitter 122 is turned off while receiver 123 remains on to detect the request-for-service signal.

A caller-ID circuit 133 along with the control unit 120 performs the caller-ID function such as described in U.S. Pat. No. 5,377,261 as part of an alerting process available to the user of the handset unit. In executing this process, a name and the receivable caller-ID telephone number, including the area code, are stored into memory. Such memory storage is provided in memory 129 which may be either random-access-memory (RAM) or electrical erasable-read-only-memory (EEPROM). Through use of this caller-ID information received over the telephone line 101, 102, the user is informed of the identity of the calling party before the call is answered. For achieving this operation, the user configures the memory by entering each of "N" desired telephone numbers, typically 10, into the memory table for subsequent access and comparison by the control unit 120 when a caller-ID number is received from a calling party. Although the number 10 is suggested as being typical for N, it is understood that N may be either less than or greater than this suggested value.

A voice help menu advantageously provides coding instructions and guides the user through the correct steps necessary to configure the memory 129 in the base unit 10 with the table of caller-ID numbers. The voice help menu is accessed by pressing a designated button and obtaining a 2-beep signal to indicate to the user that the system is ready to accept a command. The commands are usually accessed by pressing a number which represents a particular function. For example, the user, after entering the voice help menu, might hear "to play all messages, press 1," or "to play new messages, press 2," or "to program caller-ID numbers, press 9."

In addition to entering the telephone caller-ID number for people the user expects to call at some point in time, the user also is able to associate a short message with each number so that the message may be later played through the loudspeaker 235 in the handset unit 20 when the identified caller-ID number is detected on the tip-ring lines. Thus, before a message is received from a specific caller-ID number, such as the user's mother, the user can prerecord and the control unit 120 access a message that states, for example, "call from Mom," so that the user knows who is calling whenever that specific caller-ID number is detected on the tip-ring lines.

Referring next to the handset unit 20, there is shown the control unit 220 which stores the security code data that is generated by the base unit 10 and provided to the handset unit 20. This security code data stored in control unit 220 is transmitted from the handset unit 20 to the base unit 10 while establishing initial communications through a request for service signal as well as during the transfer of subsequent opcode data to the base unit. These signals are transmitted in a frequency shift keying (FSK) format and include a synchronizing signal immediately followed by a data field which includes the security code generated by the control unit 120. Like the control unit 120, this control unit 220 may be implemented through the use of a microcomputer containing ROM, RAM and through use of the proper coding. Such a microcomputer is known in the art and is readily available from semiconductor manufacturers such as Signetics, Intel and AMD.

Communications with the base unit 10 are provided via a radio transmitter 222 and a radio receiver 223 in the handset unit 20. The output of the transmitter 222 and input for the receiver 223 are commonly coupled through a duplexer 224 to an antenna 206. The receiver 223 demodulates voice signals transmitted by the base unit 10 and selectively, under the control of the control unit 220, couples these signals to either the acoustic receiver 231 or the acoustical loudspeaking device such as, for example, loudspeaker 235. The transmitter 222 has as its input speech signals from a microphone 230, security code data from control unit 220, and opcode data representative of entries on a keypad 228, all of which it transmits to the base unit 10.

A keypad 228 in the handset unit 20 is used for entering dial digits and control functions executable by the control unit 220 or transmitted to the base unit 10. The keypad 228 is also used for accessing features provided by the TAD circuit 132 in the base unit 10. Such features include call screening allowing for automatically as well as manually monitoring an incoming message, playing messages, saving messages and clearing messages. A battery 227 is also included in the handset unit 20 for providing operating power for all circuitry in this unit.

An optional display 237 in a handset unit provides an alternative way to that provided by the voice help menu for programming telephone numbers of interest into the caller-ID table located in memory 129. Such an optional display is illustratively shown in the telephone handset unit 70 of FIG. 7. Other features of handset unit 70, however, are similar to those described for handset unit 20.

In utilizing the optional display 237, the user activates the number entry process by depressing a designated button on the handset unit. This designated button then causes the display to cycle through menu screens provided on the display. Once the number entry process is activated, the user is queried by the display for each of the numbers to be entered into the caller-ID table. In response to this query, the user enters each number into the table, this number being visible in the display 237. When the user is queried as to whether to have the auto monitor feature (speakerphone at handset is activated and automatically monitors incoming calls) on or off, the user simply responds to a yes or no query prompt on the display and the auto monitor feature flag is either set or not set.

In order to conserve battery power, a controlled power-up/power-down mode of operation for the handset unit 20 is implemented in accordance with the teachings of U.S. Pat. No. 4,731,814 issued to W. R. Becker et al. The battery 227 in the handset unit 20 is normally charged while the handset unit is placed in the cradle of the base unit. When the handset unit is removed from the base unit and is in an idle or standby state awaiting a telephone call, power to the control unit 220, receiver 223 and certain other selected circuitry in the handset unit 20 is controlled to minimize power consumption. Power to other non-essential circuitry in the handset unit 20 is turned completely off during this state. The handset unit automatically turns on to a full operating mode from the controlled power-up/power-down mode in response to events such as a user depressing a key on the keypad 228 or the receipt of a ring indication from a base unit, the ring indication being indicative of an incoming call directed to the handset unit.

Figure 5:
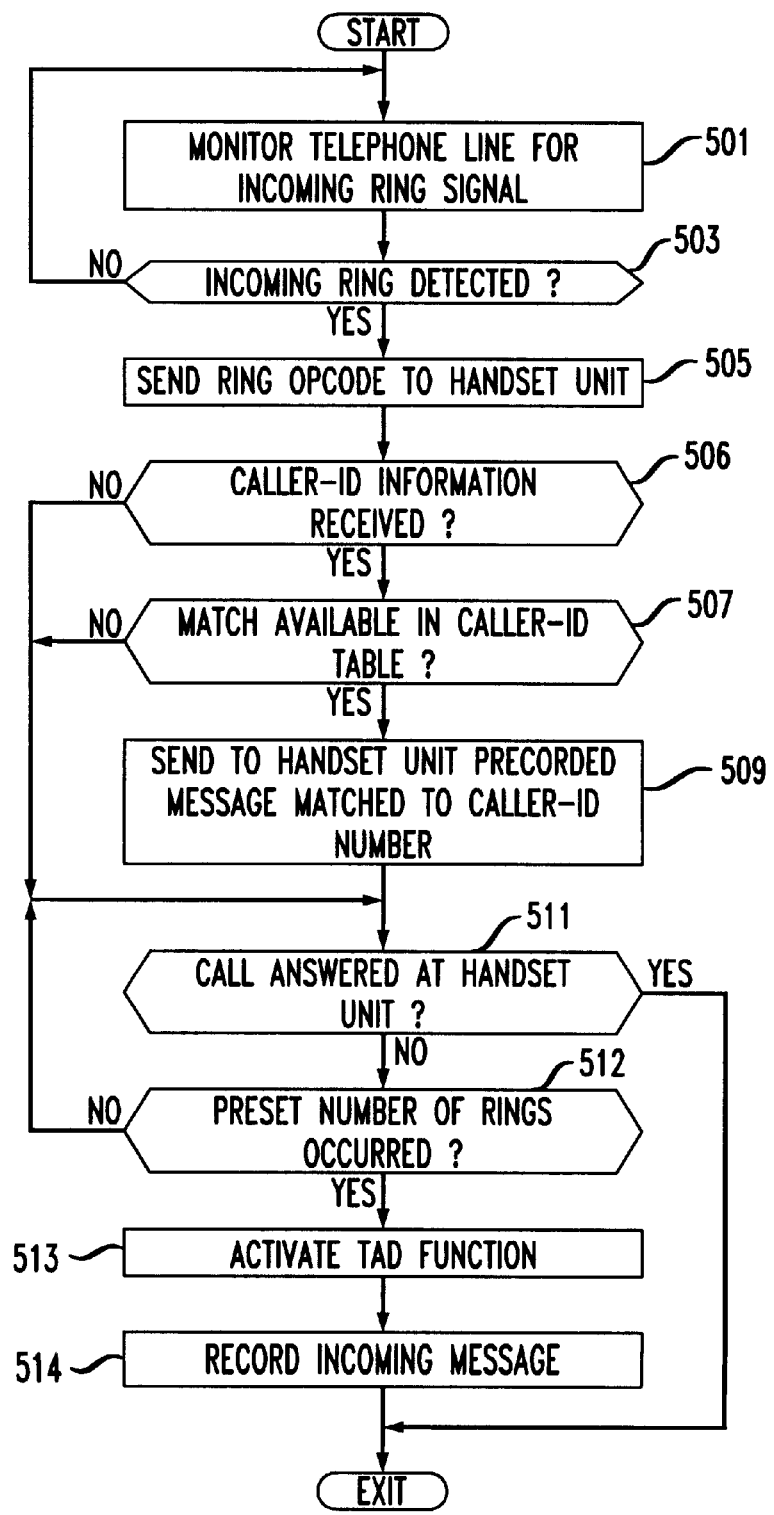
FIG. 5 shows a flow chart for illustrating the operation of the cordless telephone with the desired functionality in the execution of the telephone answering device functions.

Referring next to FIG. 5, there is shown a flow chart for illustrating the operation of the base unit in the communication system for providing the desired functionality in the execution of the TAD functions. The functions in this flow chart are advantageously provided by a process or program stored in ROM contained in control unit 120.

The process is entered in step 501 where the TAD circuitry 132 monitors the telephone line for an incoming ring signal. From step 501, the process advances to decision 503 where it is determined whether an incoming ring signal has been detected. If no ring signal has been detected, the process returns to step 501 where it looks for an incoming ring signal. If an incoming ring signal is detected at step 503, however, the process advances to step 505 where a ring opcode is transmitted from the base unit to the handset unit. If the handset unit is then cradled in the base unit, the ring opcode is transmitted through the battery charge contacts to the handset unit. However, if the handset unit is removed from the base unit, the ring opcode is transmitted to the handset unit over the frequency channel previously selected and communicated by the base unit to the handset unit.

From step 505, the process advances to decision 506 where it is determined whether caller-ID information has been received along with the incoming ring signal. If caller-ID information has been received, the process advances to decision 507 where it is determined if a match is available in memory 129, shown in FIG. 4, which contains the caller-ID table. As earlier indicated herein, this caller-ID table has N number of telephone numbers which the user has previously identified and prerecorded a message to be associated with each incoming caller-ID recognized number.

From step 507, the process advances to step 509 where the base unit sends to the handset unit the prerecorded message matched to the caller-ID number. From decisions 506 and 507, respectively, when no caller-ID information is received or when no match is available in the caller-ID table for the received caller-ID information, the process advances to decision 511. From step 509, the process also advances to decision 511. At decision 511, a determination is made as to whether the call has been answered at the handset unit. If so, the process is exited. If a call has not been answered at this decision, however, the process advances to decision 512 where it is determined whether a preset number of rings selectable by the user has occurred. If the preset number of rings has not occurred, the process returns to decision 511 where it once again determines if the call has been answered at the handset unit. If the preset number of rings has occurred without the call being answered at the handset unit, the process advances to step 513 where the TAD function is activated and the base unit goes off-hook, generating an outgoing message in response to the incoming telephone call. From step 513, the process advances to step 514 where any incoming message is recorded by the TAD circuitry in the base unit. From step 514, the process is exited.

Figure 6:
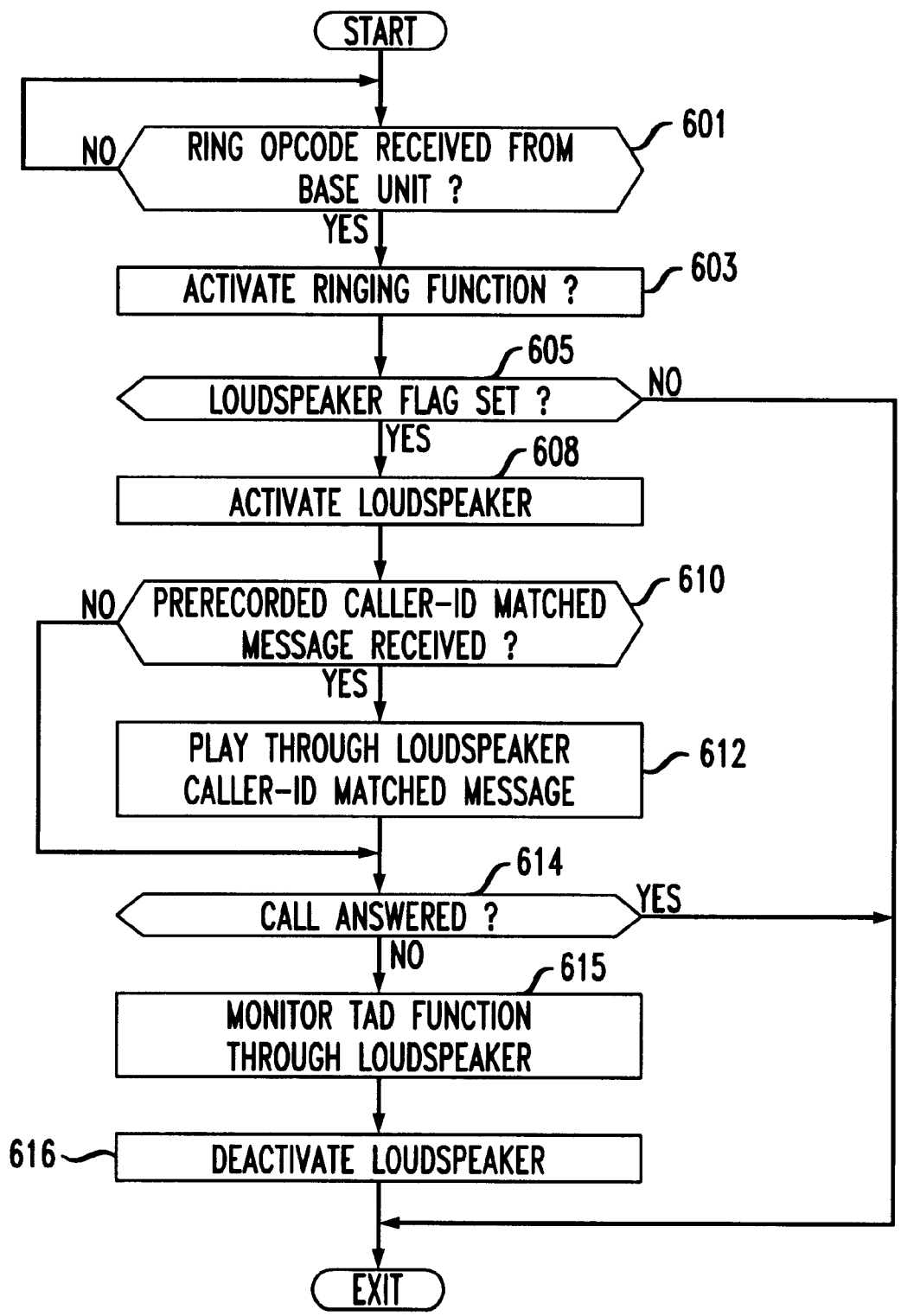
FIG. 6 shows a flow chart for illustrating the operation of the base unit with the desired functionality in accessing the telephone answering device functions.

Referring next to FIG. 6, there is shown a flow chart illustrating the operation of the handset unit 20 with the desired functionality in accessing the TAD functions available in the base unit.

The process is entered in decision 601 where it is determined whether a ring opcode has been received from the base unit. The process continues to reside at this decision until such ring opcode is received. Once such a ring opcode has been received, the process advances to step 603 where the ringing function is activated in the handset unit. From step 603, and in accordance with the disclosed embodiment, the process advances to decision 605 where it determines if a loudspeaker flag has been set. This loudspeaker flag determines whether circuitry for the loudspeaker 235 should be activated when caller-ID information has been received with an incoming call which has a telephone number that matches a caller-ID number previously entered in the memory table in the base unit. For this operation, the message previously provided by the user of the telephone to himself or herself for identifying the calling person is played at the speakerphone in the handset unit. This loudspeaker flag also determines whether the loudspeaker circuitry should be activated when the TAD circuitry in the base unit goes off-hook and answers a telephone call. For this operation, the user is able to hear the outgoing message and any incoming message from the calling party without manually configuring the handset unit in any way during the TAD operation.

If the loudspeaker flag has been set in decision 605, the process advances to step 608 where the loudspeaker circuitry is activated. If the loudspeaker flag has not been set in decision 605, the process is exited.

Once the loudspeaker circuitry has been activated in step 608, the process advances to decision 610 where it is determined whether a prerecorded caller-ID matched message is being received. If such a message is being received, the process advances to step 612 where this message is played through the loudspeaker 235. If no such message is being received as determined by decision 610, then the process advances to decision 614 where it is determined whether the call has been answered by a user at the handset unit going off-hook. If the call has not been answered, the process is exited at this decision.

If the call has not been answered at decision 614, the process advances to step 615 where the user is able to monitor the execution of the TAD functions through the loudspeaker. That is, the user is able to hear the outgoing prerecorded message and listen to any message being left by the calling party through the loudspeaker. Once the TAD function is complete, the process advances from step 615 to step 616 where the loudspeaker circuitry is deactivated. From step 616, the process is exited.

Referring next to FIGS. 7 and 8, in combination, there are respectively shown a front and rear perspective view of an alternative portable unit 70 to which the present invention may be applied. This handset unit communicates with the base unit 10 though RF signals on a designated channel. An antenna 706 is used in communicating with the base unit. This handset unit incorporates a display 237 for the user to use in communicating with the base unit. This display could also show the caller-ID number of the calling party if desired by the user at the handset unit. Also included in this handset unit is a loudspeaker 735 used for providing the auto monitor feature at the handset unit.

Various other modifications of this invention are contemplated and may obviously be resorted to by those skilled in the art without departing from the spirit and scope of the invention as hereinafter defined by the appended claims.

What is claimed is:

1. A method for selectively screening calls in a cordless telephone having a base unit and a handset unit, wherein the base unit and handset each have a control unit coupled to a memory, a transmitter arranged for transmitting coded signals and voice signals, and a receiver arranged for receiving coded signals and voice signals, wherein a ring coded signal may be transmitted by the base unit to the handset to indicate receipt of a telephone call via a telephone line interconnected to the base unit, and wherein voice signals associated with the telephone call may be intercepted and recorded by a telephone answering device (TAD) coupled to the base unit, the method comprising the steps of:

setting a loudspeaker flag in the memory in the handset unit by a handset unit user to indicate either an active or an inactive state;

transmitting the ring coded signal by the base unit transmitter;

detecting the ring coded signal in the handset unit to activate a handset ringer;

determining whether the loudspeaker flag in the handset unit memory is set to an active state; and when the loudspeaker flag is set to an active state,
coupling an amplifier and an auxiliary loudspeaker in the handset unit to the handset receiver;
activating the handset receiver for monitoring TAD-intercepted voice signals transmitted by the base unit transmitter; and
monitoring at the handset unit the intercepted voice signals via the auxiliary loudspeaker.

2. The method of claim 1, further comprising the steps of:

transmitting a coded signal from the handset unit to the base unit when monitoring of the intercepted voice signals at the handset unit has been completed; and decoupling the amplifier and the loudspeaker from the handset receiver.

3. The method of claim 1, wherein the transmitted voice signals include a caller message stored in the TAD.

4. The method of claim 3, wherein the caller message is selected from a plurality of caller-identifying messages stored in the TAD and is associated with a stored caller identifier in the base unit memory.

5. The method of claim 2, wherein the coded signal causes the base unit control unit to terminate operation of the TAD and activate the base unit transmitter and receiver so that voice signals associated with the telephone call may be transmitted to and received from the handset unit.

6. The method of claim 2, wherein the coded signal causes the base unit control unit to deactivate the base unit transmitter.

* * * * *